United States Patent
Liu et al.

(10) Patent No.: US 9,740,895 B1
(45) Date of Patent: Aug. 22, 2017

(54) METHOD AND SYSTEM FOR IDENTIFYING AND TRACKING TAGGED, PHYSICAL OBJECTS

(71) Applicant: Google Inc., Mountain View, CA (US)

(72) Inventors: Eric Liu, Santa Clara, CA (US); Jonathan James Effrat, Mountain View, CA (US)

(73) Assignee: Google Inc., Mountain View, CA (US)

( * ) Notice: Subject to any disclaimer, the term of this patent is extended or adjusted under 35 U.S.C. 154(b) by 389 days.

(21) Appl. No.: 14/292,482

(22) Filed: May 30, 2014

(51) Int. Cl.
*G06K 7/10* (2006.01)

(52) U.S. Cl.
CPC .................. *G06K 7/10366* (2013.01)

(58) Field of Classification Search
CPC  G08B 13/2462; G08B 21/18; G08B 21/0275; G11B 27/10; G11B 27/02; H04N 5/76; G06K 7/10366; G06K 17/00; G06K 7/10079; G06K 2017/0045; G01S 13/867; G01S 13/82; H04Q 2213/13095; H04Q 2209/43; H04Q 2209/823; H04Q 9/00; H04W 4/02
USPC .............................................. 340/10.1, 572.1
See application file for complete search history.

(56) References Cited

U.S. PATENT DOCUMENTS

| | | | |
|---|---|---|---|
| 7,274,292 B2 | 9/2007 | Velhal et al. | |
| RE43,809 E | 11/2012 | Krstulich | |
| 8,380,464 B2 | 2/2013 | Correl et al. | |
| 9,205,886 B1 * | 12/2015 | Hickman | B25J 9/1697 |
| 2010/0026470 A1 | 2/2010 | Wilson et al. | |
| 2011/0148625 A1 * | 6/2011 | Velusamy | G08B 13/1427 340/539.13 |
| 2012/0242481 A1 | 9/2012 | Gernandt et al. | |
| 2013/0048738 A1 * | 2/2013 | Baym | G06K 19/041 235/492 |

* cited by examiner

*Primary Examiner* — An T Nguyen
(74) *Attorney, Agent, or Firm* — Dority & Manning, P.A.

(57) ABSTRACT

A controller device with one or more processors and memory determines an identity and a location of a tagged physical object based on contextual information received from one or more sources. The controller device determines locations for each of a plurality of identifiable tags with associated tag identifiers. The controller device correlates the identity of the tagged physical object with a first set of one or more identifiable tags from among the plurality of identifiable tags based on correspondence between the determined location of the tagged physical object and at least one determined location of the first set of identifiable tags. The controller device stores the at least one determined location of the first set of identifiable tags, tag identifiers of the first set identifiable tags, and the identity of the tagged physical object in a physical object tracking table.

20 Claims, 11 Drawing Sheets

METHOD AND SYSTEM FOR IDENTIFYING AND TRACKING TAGGED, PHYSICAL OBJECTS

TECHNICAL FIELD

The disclosed implementations relate generally to home automation, and in particular, to an object tracking system for identifying and tracking tagged, physical objects.

BACKGROUND

The ability to search and find digital documents has progressed rapidly; however, the ability to search and find physical objects remains an everyday challenge. An average residence includes thousands, if not tens of thousands, of individual physical objects. For example, when a person needs to find a tool or kitchen utensil that has not been used for months or years, it can be difficult to remember where the item is located, or find the item, within the person's residence. Conventional organization and labeling systems require manual input of items, which is tedious and time-intensive to implement based on the number of items. As such, an automated object tracking system is desirable.

SUMMARY

Various implementations of systems, methods, and devices within the scope of the appended claims each have several aspects, no single one of which is solely responsible for the attributes described herein. Without limiting the scope of the appended claims, after considering this disclosure, and particularly after considering the section entitled "Detailed Description" one will understand how the aspects of various implementations are used to operate and make use of an object tracking system. For example, the object tracking system is associated with a user's house, garage, workshop, warehouse, office, and/or the like.

Some implementations include a method of identifying and monitoring a plurality of unidentified, tagged physical objects. In some implementations, the method is performed by a controller device (e.g., a server system 108, FIGS. 1 and 3) with one or more processors and memory. The method includes determining an identity and a location of a tagged physical object based on contextual information received from one or more sources. The method includes determining locations for each of a plurality of identifiable tags with associated tag identifiers. The method includes correlating the identity of the tagged physical object with a first set of one or more identifiable tags from among the plurality of identifiable tags based on correspondence between the determined location of the tagged physical object and at least one determined location of the first set of identifiable tags. The method includes storing the at least one determined location of the first set of identifiable tags, tag identifiers of the first set identifiable tags, and the identity of the tagged physical object in a physical object tracking table.

Some implementations include an electronic device or system (e.g., the server system 108, FIGS. 1 and 3), comprising: one or more processors; and memory storing one or more programs to be executed by the one or more processors, the one or more programs comprising instructions for performing or controlling performance of any of the methods described herein. Some implementations include a non-transitory computer readable storage medium, storing one or more programs for execution by one or more processors of an electronic device or system (e.g., the server system 108, FIGS. 1 and 3), the one or more programs including instructions for performing or controlling performance of any of the methods described herein. Some implementations include an electronic device or system (e.g., the server system 108, FIGS. 1 and 3) comprising means for performing or controlling performance of the operations of any of the methods described herein.

BRIEF DESCRIPTION OF THE DRAWINGS

So that the present disclosure can be understood in greater detail, a more particular description may be had by reference to the features of various implementations, some of which are illustrated in the appended drawings. The appended drawings, however, merely illustrate the more pertinent features of the present disclosure and are therefore not to be considered limiting, for the description may admit to other effective features.

Figure 1:
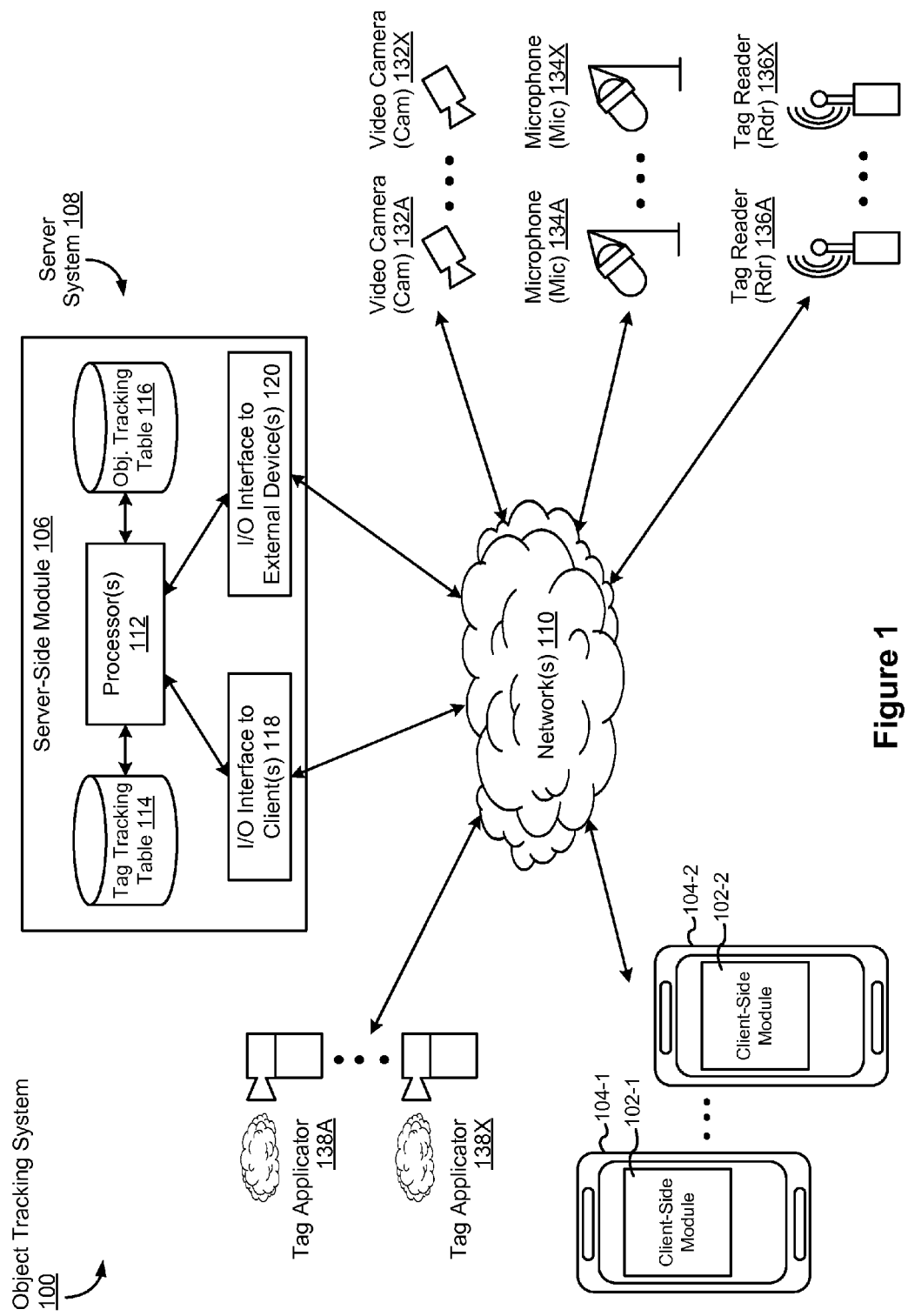
FIG. 1 is a block diagram illustrating an implementation of an object tracking system in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein in order to provide a thorough understanding of the example implementations illustrated in the accompanying drawings. However, some implementations may be practiced without many of the specific details, and the scope of the claims is only limited by those features and aspects specifically recited in the claims. Furthermore, well-known methods, components, and circuits have not been described in exhaustive detail so as not to unnecessarily obscure more pertinent aspects of the implementations described herein.

As shown in FIG. 1, data processing for an object tracking system 100 is implemented in a server-client environment in accordance with some implementations. In accordance with some implementations, the server-client environment includes client-side processing 102-1, 102-2 (hereinafter client-side module(s) 102) executed on client devices 104-1, 104-2, and server-side processing 106 (hereinafter a server-side module 106) executed on a server system 108. The client-side module 102 communicates with the server-side module 106 through one or more networks 110. The client-side module 102 provides client-side functionalities for the object tracking system 100 (e.g., handling location and identity requests for a physical object) and communications with the server-side module 106. The server-side module 106 provides server-side functionalities for the object tracking system 100, such as determining the identity and location of a respective physical object, determining the location of identifiable tags, correlating the respective physical object with one or more identifiable tags, tracking the location of the respective physical object, and responding to client requests, for any number of client modules 102 each residing on a respective client device 104.

In some implementations, the identifiable tags are each associated with a unique identifier number (e.g., a global unique identifier (GUID)). In some implementations, the identifiable tags are low-cost tags that are both microscopic and safe for human ingestion. In some implementations, the identifiable tags are also self-adhering so as to adhere or attach to physical objects (e.g., permanently or temporarily). For example, the identifiable tags are radio frequency identification (RFID) tags. In another example, the identifiable tags utilize a frequency band of the spectrum different from the radio frequency (RF) band. In some implementations, the identifiable tags are either active or passive. For example, a passive RFID tag receives an RF signal from an RFID tag reader and uses energy from the RF signal to report its GUID (e.g., to the RFID tag reader). In another example, an active tag includes an energy source or means to harvest environmental energy (e.g., solar radiation, thermal radiation, and/or other electromagnetic radiation) and periodically reports its GUID (e.g., according to a predetermined schedule or once sufficient energy has been harvested to transmit its GUID).

In some implementations, the server-side module 106 includes one or more processors 112, a tag tracking database 114, an object tracking database 116, an I/O interface 118 to the one or more clients, and an I/O interface 120 to one or more external devices. The I/O interface 118 to the one or more clients facilitates the client-facing input and output processing for the server-side module 106. The one or more processors 112 obtain contextual information corresponding to a respective physical object from one or more external devices, obtain location data corresponding to identifiable tags from one or more external devices, correlate the respective physical object with one or more identifiable tags, track the location of the respective physical object, and respond to client requests. The tag tracking database 114 stores determined locations for a plurality of identifiable tags each associated with a GUID. The object tracking database 116 stores an entry for each tagged physical object that includes the identity of the physical object (if determined), the GUIDs of one or more identifiable tags correlated with the physical object, and a current location of the physical object (See FIG. 5 and accompanying text for further discussion).

The I/O interface 120 to the one or more external services facilitates communications with and/or control of the one or more external devices, including but not limited to: one or more video cameras 132, one or more microphones 134, one or more tag readers 136, and one or more tag applicators 138. For example, the server system 108 obtains images and/or video from the one or more video cameras 132, audio information from the one or more microphones 134, and location data from the one or more tag readers 136. In some implementations, the server system 108 determines the identity of a physical object based on audio information captured by the one or more microphones 134 (e.g., a user voice input stating "This is a beautiful vase") and/or images and video captured by the one or more video cameras 132 (e.g., via image recognition or extracted barcodes). In some implementations, the server system 108 determines the location of the physical object based on images and video captured by the one or more video cameras 132 that includes the identified physical object and also a predetermined field-of-view, magnification, and location of the one or more video cameras 132.

In some implementations, the server system 108 determines the location of a respective identifiable tag based on location data associated with the respective identifiable tag from the two or more tag readers 136. For example, in the case of passive identifiable tags, a respective tag reader 136 pulses a signal which causes identifiable tags within range of the pulsed signal to transmit their respective tag identifiers. Continuing with this example, the respective tag reader 136 obtains a time delay for each identifiable tag based on the elapsed time between the pulsed signal and receiving a response (e.g., a respective tag identifier) from the identifiable tags. Continuing with this example, the respective tag reader 136 subsequently transmits these time delays to the server system 108. Continuing with this example, the server system 108 determines the location of a respective identifiable tag based on time delays observed by the two or more tag readers 136 that correspond to the respective identifiable tag and the respective locations of the two or more tag readers 136.

Examples of client devices 104 include, but are not limited to, a handheld computer, a wearable computing device, a personal digital assistant (PDA), a tablet computer, a laptop computer, a desktop computer, a cellular telephone, a smart phone, an enhanced general packet radio service (EGPRS) mobile phone, a media player, a navigation device, a game console, a television, a remote control, or a combination of any two or more of these data processing devices or other data processing devices. In one example, the client device 104 is a mobile phone associated with a user who has access to object tracking system 100. In another example, the client device 104 is an interface/panel built into or attached to a wall in the user's residence that enables the user to communicate with the server system 108. In another example, a user with has access to the object tracking system 100 communicates directly with the server system 108. In this example, the server system 108 functions as an omnipresent personal assistant within the user's residence who responds to the user's requests (e.g., location or identity requests).

Examples of the one or more networks 110 include local area networks (LAN) and wide area networks (WAN) such as the Internet. The one or more networks 110 are, optionally, implemented using any known network protocol, including various wired or wireless protocols, such as Ethernet, Universal Serial Bus (USB), FIREWIRE, Global System for Mobile Communications (GSM), Enhanced Data GSM Environment (EDGE), code division multiple access (CDMA), Long-Term Evolution (LTE), time division multiple access (TDMA), Bluetooth, Wi-Fi, voice over Internet Protocol (VoIP), Wi-MAX, or any other suitable communication protocol.

The server system 108 is implemented on one or more standalone data processing apparatuses or a distributed network of computers. In some implementations, the server system 108 also employs various virtual devices and/or services of third party service providers (e.g., third-party cloud service providers) to provide the underlying computing resources and/or infrastructure resources of the server system 108.

In FIG. 1, the object tracking system 100 includes both a client-side portion (e.g., the client-side module 102) and a server-side portion (e.g., the server-side module 106). In some implementations, data processing is implemented as a standalone application installed on the client device 104. In addition, the division of functionalities between the client and server portions of client environment data processing can vary in different implementations. For example, in some implementations, the client-side module 102 is a thin-client that provides only user-facing input and output processing functions, and delegates all other data processing functionalities to a backend server (e.g., the server system 108).

Figure 2:
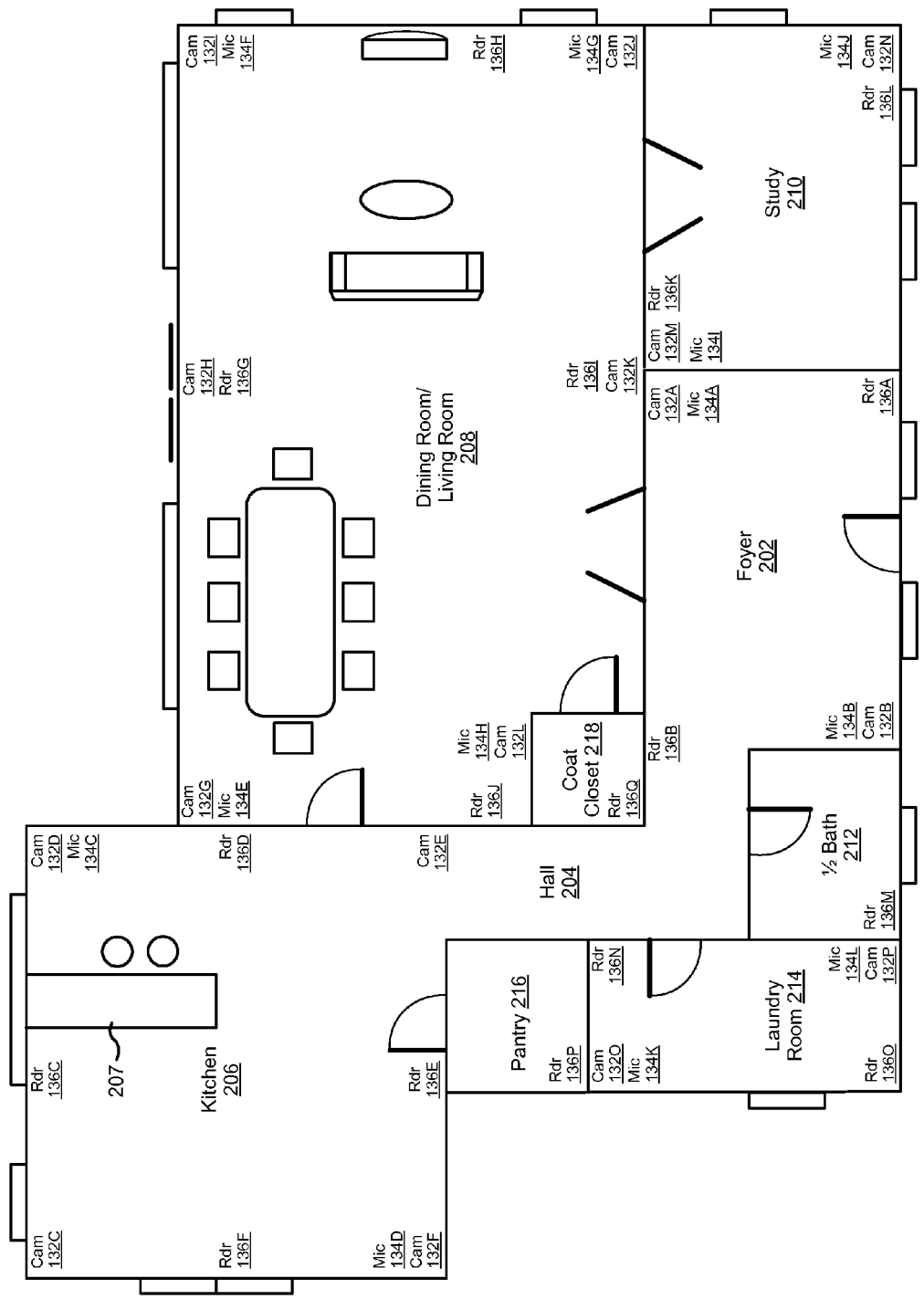
FIG. 2 is a schematic diagram of a floor plan associated with the object tracking system in accordance with some implementations.

FIG. 2 is a schematic diagram of a floor plan for a ground floor of a residence associated with the object tracking system 100 in accordance with some implementations. In some implementations, the object tracking system 100 tracks physical objects within predetermined bounds and is associated with one or more predefined users. For example, the object tracking system 100 tracks physical objects within a family's residence and only family members are authorized to use the object tracking system 100, where each member of the family is associated with an account and login credentials in order to access and use the object tracking system 100. In some implementations, server system 108 stores a floor plan or related dimensions/coordinates of the family's residence and locations of external devices associated with the object tracking system 100.

FIG. 2 illustrates the ground floor of a residence for a group of users with access to the object tracking system 100. In some implementations, the server system 108 obtains the floor plan or information associated with the floor plan (e.g., house and/or room dimensions) illustrated in FIG. 2 (e.g., upon setup or initialization of the object tracking system 100). FIG. 2 further illustrates the locations of externals devices associated with the object tracking system 100 within the ground floor of the residence, including: video cameras (cam) 132A-132P, microphones (mic) 134A-134L, and tag readers (rdr) 136A-136Q.

In some implementations, the locations of the external devices are obtained by the server system 108 and/or determined by the server system 108 based on an indoor and/or outdoor positioning system (e.g., upon setup or initialization of the object tracking system 100). In one example, a professional service or a user of the object tracking system 100 sets up and networks the external devices (e.g., pre-existing or newly installed devices) associated with the object tracking system 100 and determines setup information such as the locations and configurations for the external devices. In another example, the server system 108 determines the locations of the external devices associated with the object tracking system 100. For example, if the external devices are GPS or Wi-Fi enabled, the server system 108 determines the locations for the external devices based on GPS or Wi-Fi positioning. In another example, after determining the location of the tag readers 136, if the video cameras 132 and the microphones 134 are equipped with identifiable tags, the server system 108 determines the location of the video cameras 132 and the microphones 134 by triangulating their positions based on location data received from the tag readers 136.

In some implementations, the setup information includes the absolute coordinates of the external devices (e.g., latitudinal and longitudinal coordinates) or the coordinates of the external devices relative to the dimensions of the residence and/or floor of the residence. In some implementations, the setup information further includes parameters associated with the externals devices such as the field of view, magnification, resolution, etc. of the video cameras 132, the sensitivity of the microphones 134, and the range, strength, etc. of the tag readers 136.

In some implementations, each of the rooms has a minimum of two tag readers 136. For example, in FIG. 2, the kitchen 206, the dining/living room 208, and the laundry room 214 each include at least two tag readers 136. However, in FIG. 2, for example, the half bathroom 212 and the pantry 216 include only a single tag reader 136 as they are substantially smaller rooms. For example, the tag readers 136 are positioned in any location of the residence that has ready access to a power source. As such, the tag readers 136, for example, are positioned in power outlets, light switches, light bulb sockets, and the like.

In some implementations, the video cameras 132 and the microphones 134 are positioned so as to optimally gather contextual information for physical objects. For example, the video cameras 132 and the microphones 134 are positioned so as to capture audio and video data where goods are most likely to be un-bagged, un-packaged, or unloaded, such as a kitchen countertop, kitchen table, breakfast bar, kitchen island, dining room table, coffee table, or the like, or where goods are most likely to be used (e.g., the kitchen 206, the dining/living room 208, and the study 210). As such, rooms in which a user is more likely to user, un-bag, un-package, or unload goods (e.g., the kitchen 206 or the dining/living room 208) include more video cameras 132 and microphones 134 than other rooms where goods are merely stored, not usually used, or not usually located (e.g., the pantry 216, the half bathroom 212, and the coat closet 218). In some implementations, the video cameras 132 and the microphones 134 correspond to devices existing prior to setup/installation of the object tracking system 100 that are in communication with the server system 108 via the network(s) 110 (e.g., home security systems with microphone(s) and/or camera(s), mobile phones with microphone(s) and/or camera(s), laptops with microphone(s) and/or camera(s), desktop computers with microphones and/or web camera(s), and other electronic devices with microphone(s) and/or camera(s)).

In some implementations, the tag applicators 138 (not pictured in FIG. 2) are located in positions where goods are most likely to enter the ground floor of the residence, such as points of ingress and egress, and also positions where goods are most likely to be un-bagged, un-packaged, or unloaded such as a kitchen countertop, kitchen table, breakfast bar, kitchen island, dining room table, coffee table, or the like. For example, a tag applicator 138 can be located over the front door at the ground floor of the residence at the threshold of the foyer 202. In this example, the tag applicator 138 disperses or sprays a plurality of identifiable tags directed at the doorway or maintains a temporary air curtain of identifiable tags in the doorway as a user walks into the house with goods.

In some implementations, the tag applicators 138 are controlled by the server system 108, activated by a command from a user associated with the object tracking system 100, or automatically activated. For example, the server system 108 activates a respective tag applicator 138 to disperse identifiable tags based on facial recognition when a video feed from a respective video camera 132 indicates that a user is approaching respective tag applicator 138 or based on motion sensor data from a network of motion sensors throughout the residence indicates that the user is approaching respective tag applicator 138. In another example, a user input or request (e.g., manual activation of a physical button, a voice request, a gestural input, or other user input) activates a respective tag applicator 138 to disperse identifiable tags or causes the server system 108 to activate the respective tag applicator 138 to disperse identifiable tags. In yet another example, when respective tag applicator 138 includes a motion, thermal, or other sensor, respective tag applicator 138 automatically disperses identifiable tags in response to sensing motion, a thermal signature of a human being, or feedback from another sensor.

In one example, when a user associated with the residence illustrated in FIG. 2 comes home from a shopping trip, the user walks through the front door to the kitchen 206 via the foyer 202 and the hall 204 to unload/un-bag his/her goods on the kitchen island/breakfast bar 207. In this example, the tag applicators 138 are located over the threshold of front door to the foyer 202, in the hall 204, above the kitchen island/breakfast bar 207, and also over the threshold of the door to the pantry 216. As such, when the user walks into the ground floor of the residence with his/her bags of goods from the shopping trip, identifiable tags are dispersed on the goods as the user walks into the foyer 202 and down the hall 204. Furthermore, identifiable tags are dispersed on the goods as the user unloads his/her bags of goods on the kitchen island/breakfast bar 207 and places the goods into the pantry 216. Furthermore, as the user unloads his/her bags of goods on the kitchen island/breakfast bar 207, the video cameras 132 and the microphones 134 in the kitchen 206 gather contextual information regarding the goods so as to identity the goods.

In some implementations, when the server system 108 is able to obtain location data from a comprehensive network of tag readers, the object tracking system 100 tracks physical objects beyond the predetermined bounds of the user's residence. For example, on a typical workday, the object tracking system 100 tracks a physical object (e.g., the user's coffee mug) as it moves from the user's apartment, to the user's vehicle, and finally to the user's office. In this example, the server system 108 has stored a floor plan of the user's apartment and workplace and also the location of external devices associated with the object tracking system 100.

Figure 3:
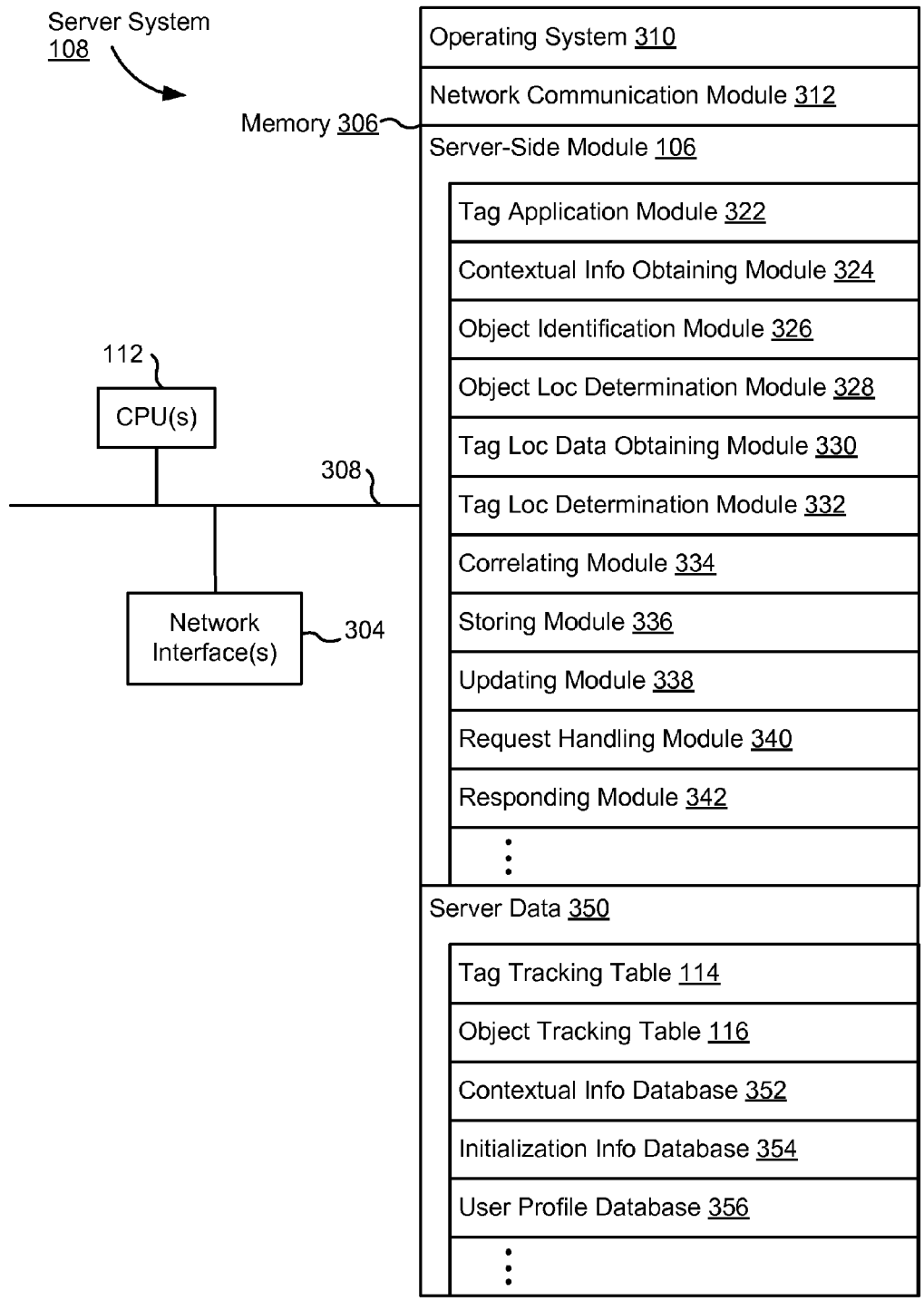
FIG. 3 is a block diagram of a server system in accordance with some implementations.

FIG. 3 is a block diagram illustrating a server system 108 in accordance with some implementations. The server system 108, typically, includes one or more processing units (CPUs) 112, one or more network interfaces 304 (e.g., including the I/O interface to one or more clients 118 and the I/O interface to one or more external devices 120), a memory 306, and one or more communication buses 308 for interconnecting these components (sometimes called a chipset). The memory 306 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 306, optionally, includes one or more storage devices remotely located from the one or more processing units 112. The memory 306, or alternatively the non-volatile memory within the memory 306, includes a non-transitory computer readable storage medium. In some implementations, the memory 306, or the non-transitory computer readable storage medium of the memory 306, stores the following programs, modules, and data structures, or a subset or superset thereof:

an operating system 310 including procedures for handling various basic system services and for performing hardware dependent tasks;

a network communication module 312 for connecting the server system 108 to other computing devices (e.g., the client devices 104 and the external devices 132, 134, 136, 138) connected to the one or more networks 110 via the one or more network interfaces 304 (wired or wireless);

a server-side module 106, which provides server-side data processing for the object tracking system 100 (e.g., tag location determination, object identification, and object tracking), includes, but is not limited to:
  (optionally) a tag application module 322 for controlling the tag applicator(s) 138;
  a contextual information obtaining module 324 for obtaining contextual information from the video camera(s) 132, the microphone(s) 134, and, optionally, the tag reader(s) 136;
  an object identification module 326 for determining the identity of physical objects based on contextual information (e.g., via image recognition, extracted barcodes, or voice input);
  an object location determination module 328 for determining the location of the physical objects based on contextual information;
  a tag location data obtaining module 330 for obtaining location data for respective identifiable tags from two or more tag readers 136;
  a tag location determination module 332 for determining the location of respective identifiable tags based on location data obtained by the tag location data obtaining module 330 for the respective identifiable tags;
  a correlating module 334 for correlating a physical object with one or more identifiable tags based on a correspondence between the determined location for the physical object and at least one determined location of the one or more identifiable tags;
  a storing module 336 for storing an entry in an object tracking table 116 for the correlated physical object and one or more identifiable tags (e.g., the entry includes the identity of the physical object (if determined), identifiers for the one or more identifiable tags (GUIDs), and the at least one determined location of the one or more identifiable tags);
  an updating module 338 for updating the current location of physical objects in the object tracking table 116 and the one or more identifiable tags correlated with physical objects in the object tracking table 116;
  a request handling module 340 for handling and responding to requests from users or the client devices 104 such as a request for the location of a physical object or a request for the identity of a physical object; ands
  a responding module 342 for responding to requests from users or the client devices 104 (e.g., with location information indicating the current location of a physical object); and server data 350 storing data for the object tracking system 100, including but not limited to:
  a tag tracking database 114 storing determined locations for a plurality of identifiable tags each associated with a GUID;

an object tracking database 116 storing an entry for each identified tagged physical object that includes the identity of the physical object (if determined), the GUIDs of one or more identifiable tags correlated with the physical object, and a current location of the physical object;

a contextual information database 352 storing contextual information from the video camera(s) 132, the microphone(s) 134, and, optionally, the tag reader(s) 136;

an initialization information database 354 storing setup information for the object tracking system 100 such as a floor plan or dimensions for a user's residence, the locations of external devices in the user's residence, and parameters associated with the externals devices (e.g., field of view, magnification, and resolution, of the video cameras 132); and a user profile database 356 storing user profiles for users of the object tracking system 100, where a respective user profile for a user includes a user/account name or handle, login credentials to the object tracking system 100, physical objects associated with the user, custom parameters (e.g., age, location, hobbies, etc.) for the user, and identified trends and/or likes/dislikes of the user.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, or modules, and thus various subsets of these modules may be combined or otherwise re-arranged in various implementations. In some implementations, the memory 306, optionally, stores a subset of the modules and data structures identified above. Furthermore, the memory 306, optionally, stores additional modules and data structures not described above.

Figure 4:
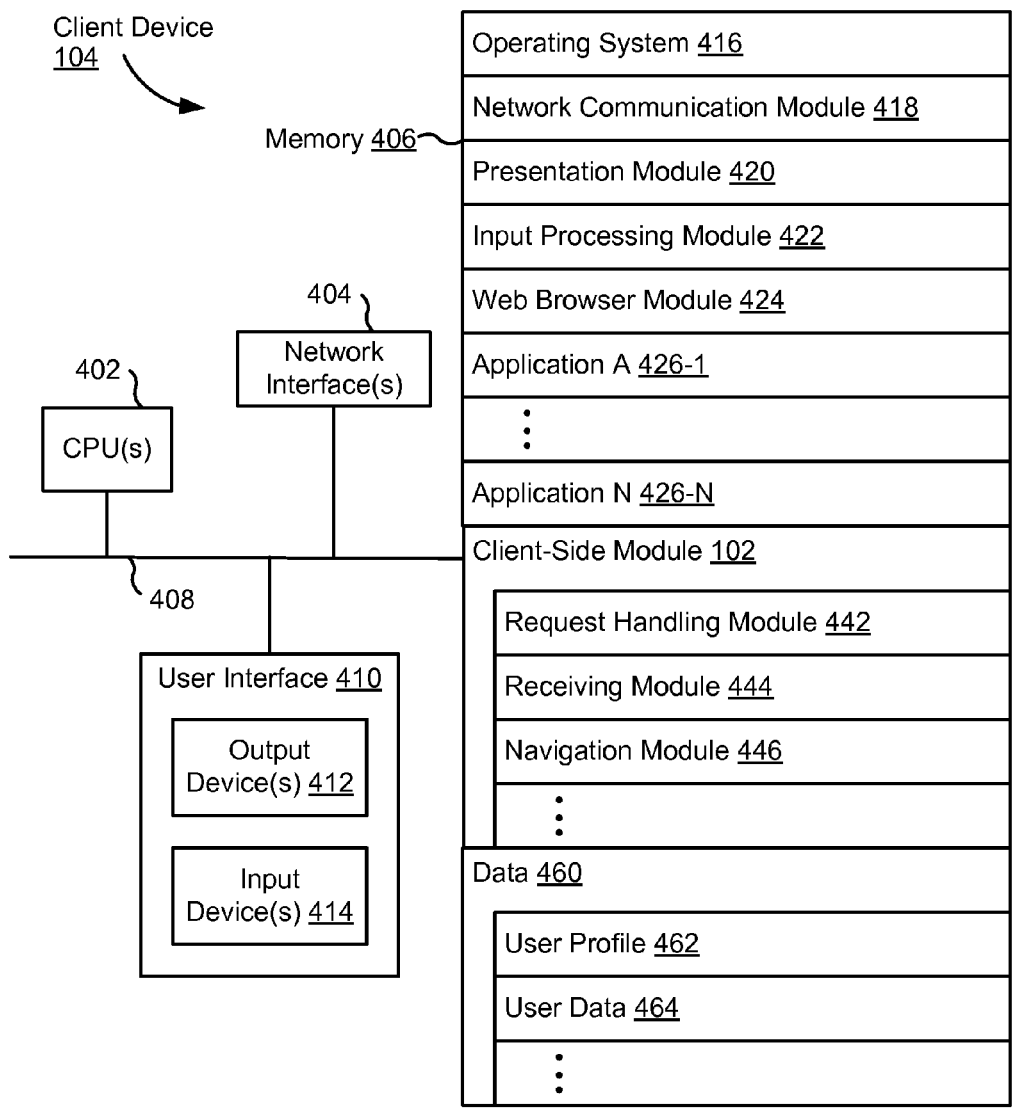
FIG. 4 is a block diagram of a client device in accordance with some implementations.

FIG. 4 is a block diagram illustrating a representative client device 104 associated with a user in accordance with some implementations. The client device 104, typically, includes one or more processing units (CPUs) 402, one or more network interfaces 404, a memory 406, and one or more communication buses 408 for interconnecting these components (sometimes called a chipset). The client device 104 also includes a user interface 410. The user interface 410 includes one or more output devices 412 that enable presentation of information and media content, including one or more speakers and/or one or more visual displays. The user interface 410 also includes one or more input devices 414, including user interface components that facilitate user input such as a keyboard, a mouse, a voice-command input unit or microphone, a touch screen display, a touch-sensitive input pad, a camera, a gesture capturing camera, or other input buttons or controls. Furthermore, some client devices 104 use a microphone and voice recognition or a camera and gesture recognition to supplement or replace the keyboard. The memory 406 includes high-speed random access memory, such as DRAM, SRAM, DDR RAM, or other random access solid state memory devices; and, optionally, includes non-volatile memory, such as one or more magnetic disk storage devices, one or more optical disk storage devices, one or more flash memory devices, or one or more other non-volatile solid state storage devices. The memory 406, optionally, includes one or more storage devices remotely located from the one or more processing units 402. The memory 406, or alternatively the non-volatile memory within the memory 406, includes a non-transitory computer readable storage medium. In some implementations, the memory 406, or the non-transitory computer readable storage medium of the memory 406, stores the following programs, modules, and data structures, or a subset or superset thereof:

an operating system 416 including procedures for handling various basic system services and for performing hardware dependent tasks;

a network communication module 418 for connecting the client device 104 to other computing devices (e.g., the server system 108) connected to the one or more networks 110 via the one or more network interfaces 404 (wired or wireless);

a presentation module 420 for enabling presentation of information (e.g., a user interface for the object tracking system 100, widgets, websites and webpages thereof, games, and/or applications, and other text, audio, and/or video content) at the client device 104 via the one or more output devices 412 (e.g., displays, speakers, etc.) associated with the user interface 410;

an input processing module 422 for detecting one or more user inputs or interactions from one of the one or more input devices 414 and interpreting the detected input or interaction;

(optionally) a web browser module 424 for navigating, requesting (e.g., via HTTP), and displaying websites and web pages thereof;

(optionally) one or more applications 426-1-426-N for execution by the client device 104 (e.g., games, application marketplaces, and/or other applications); and a client-side module 102, which provides client-side data processing and functionalities for the object tracking system 100, including but not limited to:

a request handling module 442 for handling and routing requests from a user of the client device 104 to the server system 108 such as a request for the location of a physical object (e.g., a location request) or a request for the identity of a physical object (e.g., an identity request);

a receiving module 444 for receiving information from the server system 108 in response to requests such as location information indicating the current location of a physical object or the identity of a physical object; and a navigation module 446 for navigating or directing the user of the client device 104 to the current location of a physical object associated with a location request (See FIGS. 7A-7B and accompanying text for further discussion); and client data 460 storing data associated with the client device 104, including, but is not limited to:

a user profile 462 storing a user profile associated with the user of the client device 104 including a user/account name or handle, login credentials to the object tracking system 100, physical objects associated with the user, custom parameters (e.g., age, location, hobbies, etc.) for the user, and identified trends and/or likes/dislikes of the user; and user data 464 storing data corresponding to the user of the client device 104.

Each of the above identified elements may be stored in one or more of the previously mentioned memory devices, and corresponds to a set of instructions for performing a function described above. The above identified modules or programs (i.e., sets of instructions) need not be implemented as separate software programs, procedures, modules or data structures, and thus various subsets of these modules may be combined or otherwise re-arranged in various implementations. In some implementations, the memory 406, optionally, stores a subset of the modules and data structures identified above. Furthermore, the memory 406, optionally, stores additional modules and data structures not described above.

In some implementations, at least some of the functions of the server system 108 are performed by the client device 104, and the corresponding sub-modules of these functions may be located within the client device 104 rather than the server system 108. In some implementations, at least some of the functions of the client device 104 are performed by the server system 108, and the corresponding sub-modules of these functions may be located within the server system 108 rather than the client device 104. The client device 104 and the server system 108 shown in FIGS. 3-4, respectively, are merely illustrative, and different configurations of the modules for implementing the functions described herein are possible in various implementations.

Figure 5:
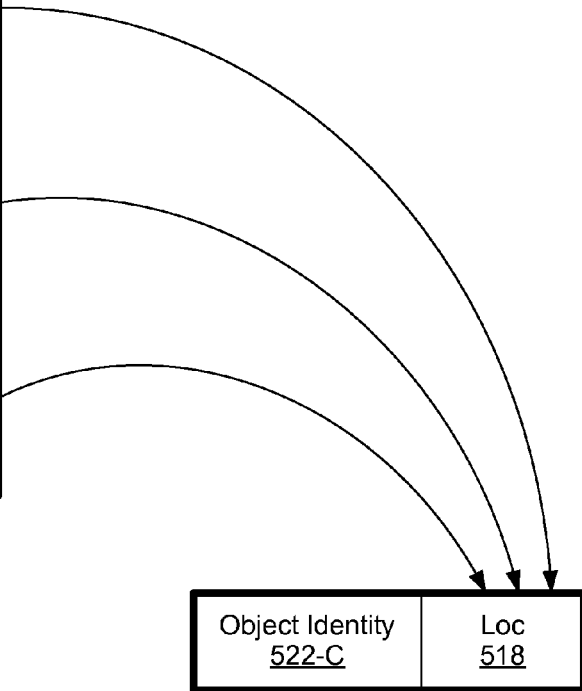
FIG. 5 illustrates block diagrams of data structures associated with the object tracking system in accordance with some implementations.

FIG. 5 illustrates block diagrams of data structures associated with the object tracking system 100 in accordance with some implementations. In some implementations, a tag tracking table 114 and/or an object tracking table 116 are stored and maintained by server system 108. In some implementations, the tracking table 114 and/or the object tracking table 116 are stored remote from the server system 108 but are maintained by the server system 108. In some implementations, the server system 108 manages and maintains the object tracking system 100 so that users of the object tracking system 100 may request the location or identity of physical objects.

In some implementations, the tag tracking table 114 includes a plurality of entries each associated with an identifiable tag. In some implementations, a respective entry in the tag tracking table 114 corresponding to a respective identifiable tag includes a tag identifier 512 (e.g., a number or GUID) for the respective identifiable tag and a location 514 determined by the server system 108 or a component thereof (e.g., the tag location determination module 332, FIG. 3) for the respective identifiable tag.

In some implementations, the server system 108 or a component thereof (e.g., the object identification module 326, FIG. 3) determines an identity 522-C of a respective physical object based on audio information captured by the one or more microphones 134 and/or images and video captured by the one or more video cameras 132. For example, in some implementations an identity 522-C might be a common name for a tagged object, such as "mom's car keys," "box of raisin-wheat cereal," or "dad's wallet." In some implementations, the identity 522-C might be a key to a standardized description in another database. In some implementations, the identity 522-C might include a combination of a common name for a tagged object along with a database key. For example, a user can verbally assign a preferred name to a particular object that is stored as the common name for that object and a key to a standardized description is also associated with the same object as part of the identity 522-C.

In some implementations, after determining the object identity 522-C for the respective physical object, the server system 108 or a component thereof (e.g., the object location determination module 328, FIG. 3) determines a location 518 for the respective physical object. In some implementations, the location is a numerical location in an (x,y) or (x,y,z) coordinate system that is referenced to the house or a room in the house in which the objects are located. In some implementations, the location is a numerical location in an (x,y) or (x,y,z) coordinate system that is absolute such as latitude, longitude, and elevation coordinates. In some implementations, in addition to a numerical location, the location also includes a user friendly location description, such as "shelf in pantry," "kitchen table," or "Becky's dresser."

Then, the server system 108 or a component thereof (e.g., the correlating module 334, FIG. 3) correlates the object identity 522-C for the respective physical object with the one or more tag identifiers 512 based on the location 518 for the respective physical object and locations 514 for one or more identifiable tags corresponding to the one or more tag identifiers 512. For example, the locations 514-A, 514-C, and 514-E are within a predetermined distance of the location 518. Thus, in this example, the server system 108 correlates the object identity 522-C with the tag identifiers 512-A, 512-C, and 512-E. In some implementations, the predetermined distance accounts or compensates for the parameters of the video camera(s) 132 and the microphone(s) 134 (e.g., the magnification and resolution of the video camera(s) 132) and the accuracy of the server system 108 in determining the locations 514 for the identifiable tags and the location 518 for the respective physical object.

In some implementations, the object tracking table 116 includes a plurality of entries for identified physical objects. In some implementations, a respective entry in the object tracking table 116 corresponding to a respective identified physical object includes the object identity 522 of the respective identified physical object, the one or more tag identifiers 524 correlated with the respective identified physical object, and a current location 526 of the respective identified physical object. In some implementations, the current location 526 of the respective identified physical object is the average location or the center of mass/gravity of the locations 514 for the identifiable tags correlated with the respective identified physical object. In some implementations, the current location 526 of the respective identified physical object is the location 514 of one of the identifiable tags correlated with the respective identified physical object.

In some implementations, an entry in the object tracking table 116 is generated for a respective physical object after correlating the respective physical object with one or more identifiable tags but prior to identifying the respective physical object. As such, contextual information regarding the unidentified physical object is gathered and stored in the contextual information database 352 for the unidentified physical object until it can be identified (See steps 808 and 810 of FIG. 8 and accompanying text for further discussion).

Figure 6:
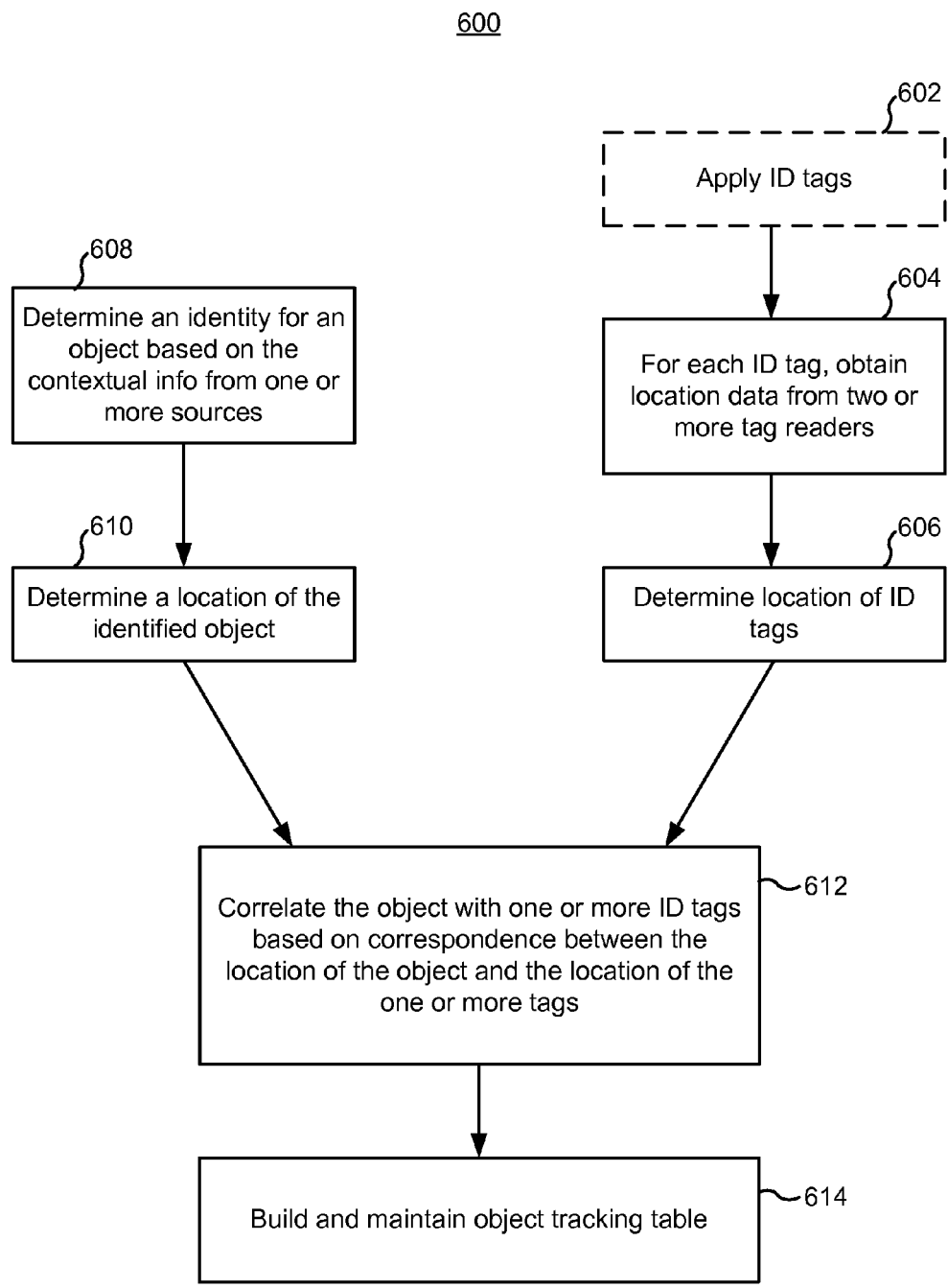
FIG. 6 illustrates a flowchart diagram of a method of correlating objects with identifiable tags in accordance with some implementations.

FIG. 6 is a flowchart diagram of a method 600 of correlating objects with identifiable tags for the object tracking system 100 in accordance with some implementations. In some implementations, the method 600 is performed by a controller device with one or more processors and memory. For example, in some implementations, method 600 is performed by the server system 108 (FIGS. 1 and 3) or a component thereof (e.g., the server-side module 106, FIGS. 1 and 3) that controls operation of the object tracking system 100. In some implementations, the method 600 is governed by instructions that are stored in a non-transitory computer readable storage medium and the instructions are executed by one or more processors of the server system. Optional operations are indicated by dashed lines (e.g., boxes with dashed-line borders).

In some implementations, the controller device controls (602) one or more tag applicators 138 to apply one or more identifiable tags to an untagged (or previously tagged) physical objects. In some implementations, the physical objects were previously tagged (e.g., by the one or more tag applicators 138 or by a retailer or manufacturer of the physical object). In some implementations, the one or more tag applicators 138 are controlled by the server system 108, activated by a command from a user associated with the object tracking system 100, or automatically activated to disperse identifiable tags.

In some implementations, for each of a plurality of identifiable tags, the controller device obtains (604) location data from two or more tag readers. In some implementations, the server system 108 or a component thereof (e.g., the tag location data obtaining module 330, FIG. 3) obtains location data corresponding to a respective identifiable tag from the two or more tag readers 136. In one example, when using passive identifiable tags, the server system 108 requests location data from the tag readers 136, which causes the tag readers 136 to pulse a signal. This signal causes identifiable tags within range of the signal to transmit their respective tag identifiers. Continuing with this example, a respective tag reader 136 obtains a time delay for each identifiable tag based on the elapsed time between the pulsed signal and receiving a response (e.g., a respective tag identifier) from the identifiable tags. Continuing with this example, the respective tag reader 136 transmits the time delays to the server system 108. In another example, when using passive identifiable tags, the tag readers 136 periodically pulse the signal so as to obtain the time delays, and the tag readers 136 provide the time delays to the server system 108 (e.g., constantly or periodically) or when polled by the server system 108.

In some implementations, the controller device determines (606) a location for each of the plurality of identifiable tags. In some implementations, server system 108 or a component thereof (e.g., the tag location determination module 332, FIG. 3) determines the location of a respective identifiable tag by triangulating the respective identifiable tag's location based on the location data from two or more tag readers. Continuing with the example in step 604, the server system 108 determines the location of a respective identifiable tag based on time delays observed by two or more tag readers 136 that correspond to the respective identifiable tag and the respective locations of the two or more tag readers 136.

In some implementations, the controller device determines (608) an identity for an unidentified tagged physical object base on contextual information obtained from one or more sources. In some implementations, the one or more sources include images and/or video from the one or more video cameras 132, audio information from the one or more microphones 134, and/or location data from the one or more tag readers 136. In some implementations, the server system 108 or a component thereof (e.g., the object identification module 326, FIG. 3) determines the identity of a physical object based on audio information captured by the one or more microphones 134 (e.g., a user voice input regarding the physical object), images and video captured by the one or more video cameras 132 (e.g., via image recognition or extracted barcodes), and/or other contextual information regarding the physical object.

In some implementations, the controller device determines (610) a location of the identified tagged physical object. In some implementations, the server system 108 or a component thereof (e.g., the object location determination module 328, FIG. 3) determines the location of the physical object based on audio information captured by the one or more microphones 134 that is associated with the physical object, images and video information captured by the one or more video cameras 132 that includes the physical object, and/or other contextual information regarding the physical object. For example, images or video clips captured by a respective video camera 132 include the physical object. Subsequently, the server system 108 determines the location of the physical object based on the field-of-view, magnification, and location of the respective video camera 132 and the physical object's position in the images or video clips captured by the respective video camera 132.

In some implementations, the controller device correlates (612) the identified tagged physical object with one or more identifiable tags based on correspondence between the location of the identified tagged physical object and the locations of the one or more identifiable tags. In some implementations, the server system 108 or a component thereof (e.g., the correlating module 334, FIG. 3) correlates the identified physical object with one or more identifiable tags whose determined locations are within a predetermined distance of the determined location of the physical object.

In some implementations, the controller device builds and maintains (614) the object tracking table 116. In some implementations, the server system 108 maintains the object tracking table 116, which includes a plurality of entries for physical objects. In some implementations, after correlating an identified physical object with one or more identifiable tags, the server system 108 or a component thereof (e.g., the storing module 336, FIG. 3) stores an entry in the object tracking table 116 for the identified physical object. In FIG. 5, for example, a respective entry in the object tracking table 116 corresponding a respective physical object includes an object identity 522 of the respective physical object, one or more tag identifiers 524 for identifiable tags correlated with the respective physical object, and a current location 526 of the physical object. In some implementations, for a respective physical object, the server system 108 or a component thereof (e.g., the updating module 338, FIG. 3) updates the current location of the respective physical object in the object tracking table 116 as the respective physical object moves and also updates the one or more tag identifiers 524 for identifiable tags correlated with the respective physical object as identifiable tags fall off of the respective physical object and additional identifiable tags are adhered or attached to the respective physical object.

Figure 7A:
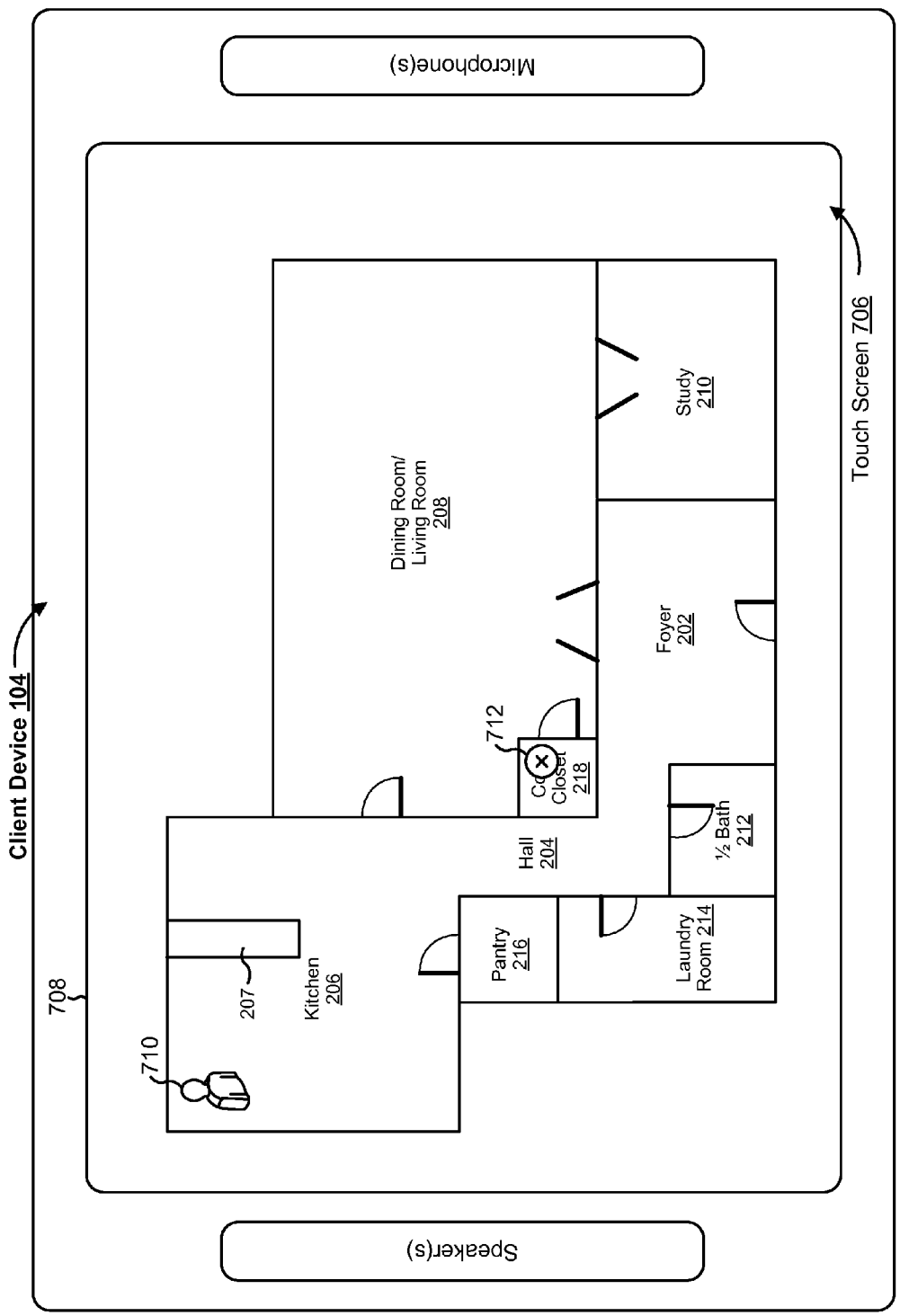
FIGS. 7A-7B illustrate example user interfaces for responding to a user request for the location of a physical object in accordance with some implementations.
Figure 7B:
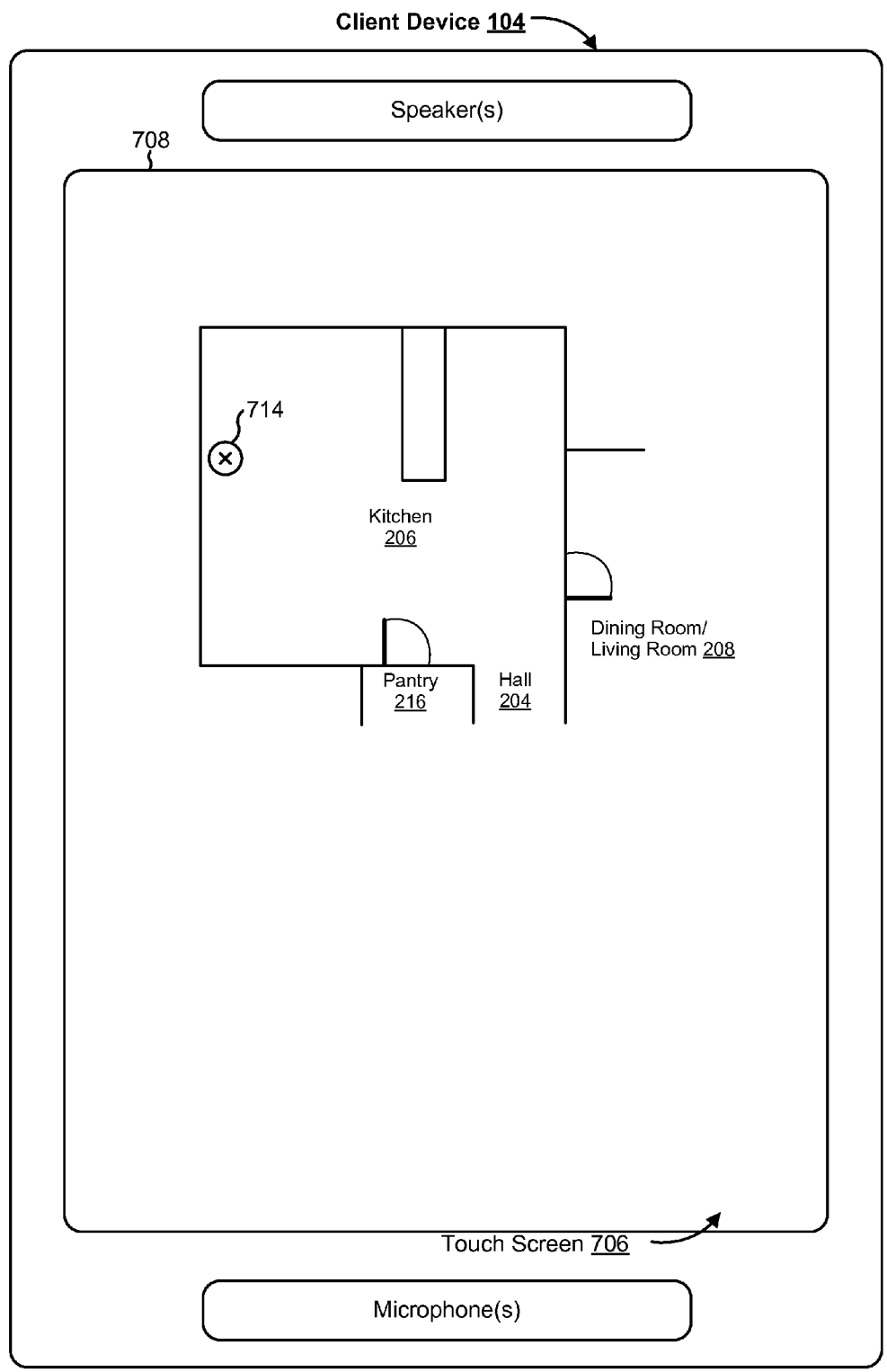

Attention is now directed towards implementations of user interfaces and associated processes that may be implemented on a client device 104. In FIGS. 7A-7B the client device 104 includes a touch screen 706 (sometimes also herein called a touch screen display) enabled to receive one or more user touch inputs and display information (e.g., user interfaces for the object tracking system 100, widgets, websites and webpages thereof, games, and/or applications, and other text, audio, and/or video content), one or more speakers, and one or more microphones.

FIGS. 7A-7B show an interface 708 for a program or application associated with the object tracking system 100 (e.g., the client-module 102, FIGS. 1 and 4) displayed on the touch screen 706 of the client device 104 (e.g., a mobile computing device, mobile phone, or a tablet or laptop computer); however, one skilled in the art will appreciate that the user interfaces shown in FIGS. 7A-7B may be implemented on other similar computing devices. In some embodiments, the program or application associated with the object tracking system 100 receives location and/or identity requests from a user and, in some circumstances, presents an answer to the user's request. FIGS. 7A-7B illustrate example user interfaces for responding to a user to a user request for the location of a physical object in accordance with some implementations.

For example, a user with access to object tracking system 100 is associated with a respective client device 104 (e.g., a mobile phone). Continuing with this example, the user accesses the object tracking system 100 by executing a program or application on the respective client device 104 that is associated with the object tracking system 100 (e.g., the client-side module 102, FIGS. 1 and 4) and entering login credentials corresponding to the user's account for the object tracking system 100 so as to authenticate the user.

Thereafter, for example, the user requests the current location of a physical object (e.g., a location request) via a voice input captured by the one or more microphones of the client device 104 (e.g., "Where are my red handled scissors?"). Continuing with this example, in response to receiving the request, client device 104 or a component thereof (e.g., the request handling module 442, FIG. 3) sends the request to the server system, where the request includes the identity of the physical object (e.g., the red handled scissors). Continuing with this example, after sending the request, the client device 104 or a component thereof (e.g., the receiving module 444, FIG. 3) receives location information indicating the current location of the physical object. For example, server system 108 maintains an object tracking table 116 that links physical objects associated with the object tracking system 100 with their current locations. Thus, the object tracking table 116 enables the server system 108 to determine the current location of the physical object (e.g., the red handled scissors) as the identity of the physical object is included in the location request.

In one example, the location information includes a descriptive location of the physical object such as "Your red handled scissors are:" "in your daughter's bedroom," "in the bottom drawer in the kitchen," or "on the table in the playroom next to the construction paper." For example, the descriptive location places the current location of the physical object in context of or in relation to another nearby physical object that is another frequently used by the user. In another example, the location information includes the absolute coordinates of the physical object or coordinates of the physical object the physical object relative to the dimension's of the user's residence. In some implementations, the program or application on the respective client device 104 that is associated with object tracking system 100 (e.g., client-side module 102, FIGS. 1 and 4) navigates the user to the physical object based on the coordinates in the received location information. For example, the program or application that is associated with the object tracking system 100 audibly guides the user to the physical object or displays the location of the physical object on a map. As such, the program or application that is associated with the object tracking system 100 converts the coordinates in the received location information into, or presents the coordinates in the received location information in, an efficient, convenient, and user-friendly form that makes it easy for the user to locate the physical object associated with the location request.

FIG. 7A illustrates the client device 104 displaying a first example user interface for the program or application that is associated with the object tracking system 100. In FIG. 7A, the first user interface shows a location 710 of the user in kitchen 206 and a current location 712 of the physical object associated with the location request in the coat closet 218. For example, the location 710 corresponds to the location client device 104 based on WiFi positioning, GPS positioning, or other positioning systems associated with the client device 104. In FIG. 7A, the first user interface shows the locations relative to the floor plan for the ground floor of the residence associated with the user.

FIG. 7B illustrates the client device 104 displaying a second example user interface for the program or application that is associated with the object tracking system 100. In FIG. 7B, the second user interface shows a current location 714 of the physical object associated with the location request in the kitchen 206 relative to a portion of the floor plan for the ground floor of the residence associated with the user.

Figure 8A:
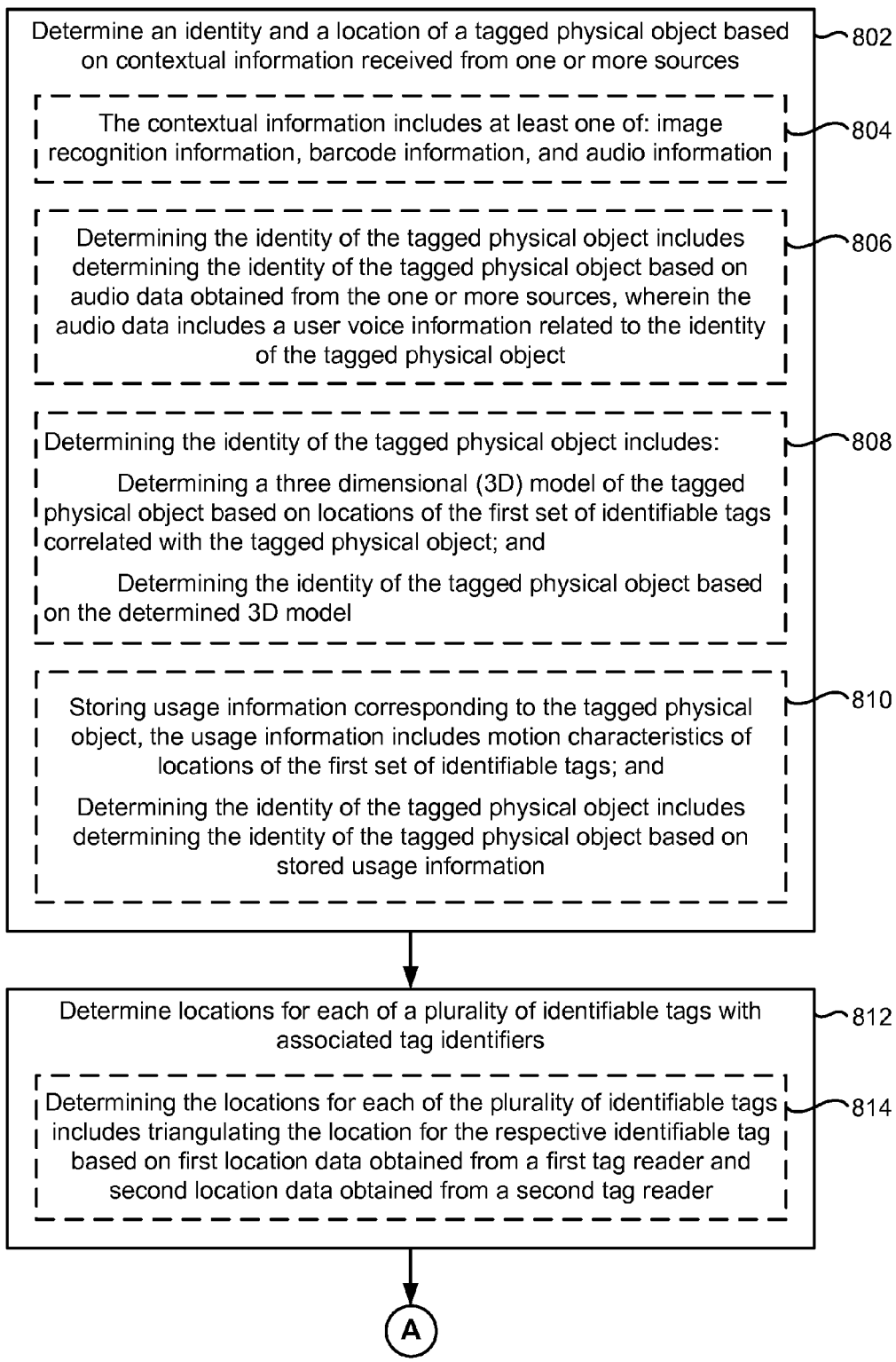
FIGS. 8A-8C illustrate a flowchart diagram of a method of identifying and monitoring a plurality of unidentified, tagged physical objects in accordance with some implementations.
Figure 8B:
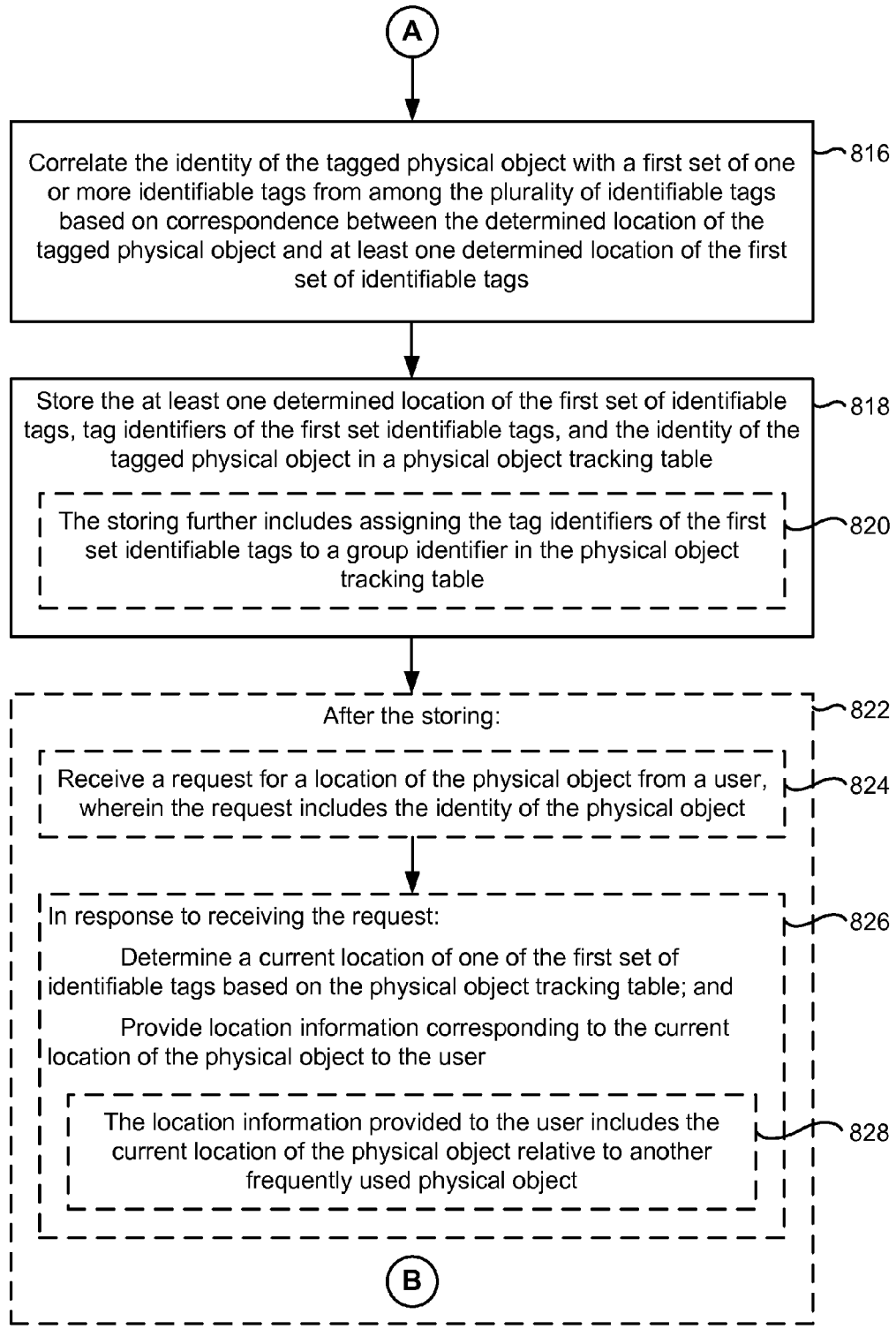
Figure 8C:
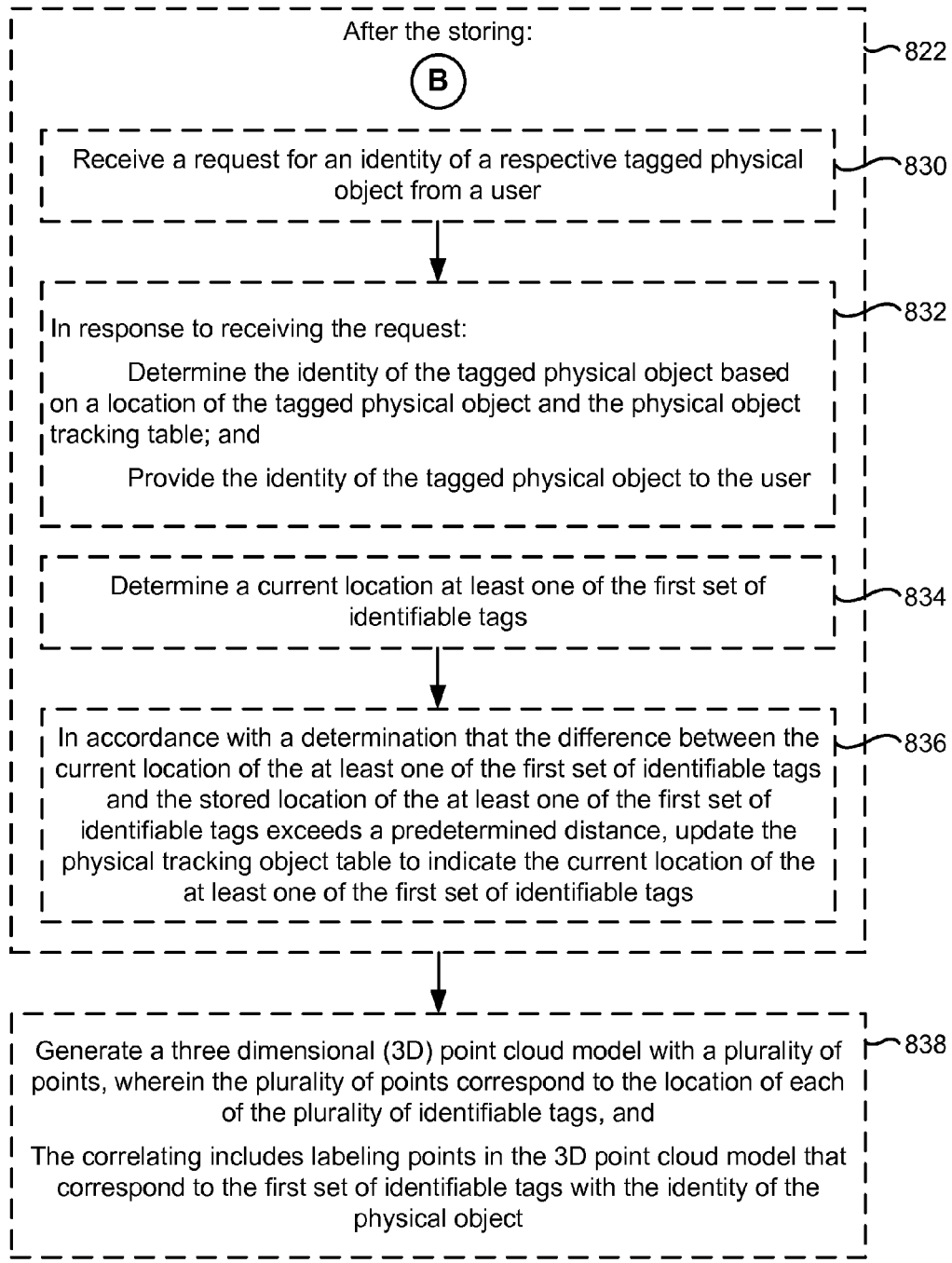

FIGS. 8A-8C illustrate a flowchart diagram of a method 800 of identifying and monitoring a plurality of unidentified, tagged physical objects in accordance with some implementations. In some implementations, the method 800 is performed by a controller device with one or more processors and memory. For example, in some implementations, the method 800 is performed by the server system 108 (FIGS. 1 and 3) or a component thereof (e.g., the server-side module 106, FIGS. 1 and 3) that controls operation of object tracking system 100. In some implementations, the method 800 is governed by instructions that are stored in a non-transitory computer readable storage medium and the instructions are executed by one or more processors of the server system. Optional operations are indicated by dashed lines (e.g., boxes with dashed-line borders).

In some implementations, unidentified physical objects are tagged with one or more identifiable tags by one or more tag applicators 138 associated with the object tracking system 100 or by a retailer or manufacturer of the physical objects. In some implementations, the identifiable tags are low-cost, microscopic, and safe for human ingestion. In one example, the identifiable tags are passive RFID tags.

The controller device determines (802) an identity and a location of a tagged physical object based on contextual information received from one or more sources. In some implementations, the one or more sources include images and/or video from the one or more video cameras 132, audio information from the one or more microphones 134, and/or location data from the one or more tag readers 136. In one embodiment, server system 108 determines the identity of a physical object by performing an image recognition process on an image or video clip from the one or more video cameras 132 that includes the physical object. For example, the image recognition process determines that the shape, color, and/or texture of the physical object is consistent with the shape, color, and/or texture of a banana, bandana, or banjo. In another embodiment, the server system 108 determines the identity of the physical object by extracting a barcode, SKU, QR code, serial number, or other unique identifier from an image or video clip from the one or more video cameras 132 that includes the physical object and determining the identity of the physical object based on the extracted barcode, SKU, QR code, serial number, or other unique identifier. In another embodiment, a user with access to the object tracking system 100 uses the program or application that is associated with the object tracking system 100 (e.g., the client-side module 102, FIGS. 1 and 4) on his/her respective client device 104 to identify the physical object. For example, the user takes a photo of the physical object and uploads the photo to the program or application along with a manual input or voice input indicating the identity of the physical object in the photo. In some implementations, the server system 108 determines the identity of the physical object based on a combination of the above implementations.

In one embodiment, the server system 108 determines the location of the physical object based on an image or video clip captured by a respective video camera 132 that includes the physical object. For example, the server system 108 determines the location of the physical object based on the physical object's position in the images or video clip captured by the respective video camera 132 relative to the field-of-view, magnification, and location of the respective video camera 132. In another embodiment, the server system 108 determines the location of the physical object based on an indoor and/or outdoor positioning system such as Wi-Fi, Bluetooth, or GPS positioning when the physical object is with Wi-Fi, Bluetooth, or GPS capabilities. In another embodiment, the server system 108 determines the location of the physical object based on RF imagining or echolocation. For example, the tag readers 138 emit RF pulses, and the server system 108 determines the location of the physical object based on the signature of the RF waves reflected off of the physical object. In another example, when object tracking system 100 includes audio and/or ultrasound emitting devices, the audio and/or ultrasound emitting devices emit sound waves, and the server system 108 determines the location of the physical object based on the signature of sound waves reflected off of the physical object.

In some implementations, the contextual information includes (804) at least one of: image recognition information, barcode information, and audio information. As discussed above in step 802 and below in step 806, the server system 108 leverages images and/or video from the one or more video cameras 132 for image recognition or barcode extraction purposes, audio information from the one or more microphones 134, and/or location data from the one or more tag readers 136 as contextual information for determining the identity and location of a respective physical object.

In some implementations, determining the identity of the tagged physical object includes (806) determining the identity of the tagged physical object based on audio data obtained from the one or more sources, where the audio data includes a user voice information related to the identity of the tagged physical object. In some implementations, the server system 108 determines the identity of the physical object based on a user voice input captured by the one or more microphones 134 that includes the identity of the physical object. For example, when picking up, motioning towards, or referring to an object, the user indicates the object's identity such as "this paring knife is dull, we need to sharpen it," "please pass the bottle of ketchup," or "this bread maker just sits here and takes up counter space, why don't we use it more often." As such, the server system 108 leverages this audio information to identity physical objects.

In some implementations, determining the identity of the tagged physical object includes (808): determining a three-dimensional (3D) model of the tagged physical object based on locations of the first set of identifiable tags correlated with the tagged physical object; and determining the identity of the tagged physical object based on the determined 3D model. In some implementations, based on the location of identifiable tags that are correlated with an unidentified physical object, the server system 108 generates a 3D model corresponding to the shape of the physical object and determines an identity for the tagged physical object based on the shape. For example, when the surface area of the unidentified physical object is substantially covered in identifiable tags, the server system 108 generates a 3D model of the physical object and the server system 108 performs an image recognition process on the 3D model to determine that the shape of the physical object is consistent with the shape of a stapler, comb, or crochet hook.

In some implementations, the controller device stores (810) usage information corresponding to the tagged physical object, where the usage information includes motion characteristics of locations of the first set of identifiable tags, and determining the identity of the tagged physical object includes determining the identity of the tagged physical object based on stored usage information. In some implementations, based on the motion of identifiable tags correlated with an unidentified physical object indicating the usage the unidentified physical object, the server system 108 determines the identity of the unidentified physical object. In some implementations, usage information corresponding to the motion and location data for identifiable tags correlated with unidentified objects is stored in the contextual information database 352. For example, when a user drinks from a pint glass or tumbler, the pint glass or tumbler is tipped to the user's mouth in substantially the same manner and at substantially the same angle each time the user drinks from the pint glass or tumbler. As such, continuing with this example, location data gathered for identifiable tags correlated with the pint glass or tumbler will match a similar motion profile each time the user drinks from the pint glass or tumbler. Thus, in this example, the server system 108 determines the identity of the pint glass or tumbler (i.e., as a pint glass or tumbler) based on the location data from the repeat drinking motions.

The controller device determines (812) locations for each of a plurality of identifiable tags with associated tag identifiers. As discussed herein and below in step 814, the server system 108 determines a location of a respective identifiable tag based on location data corresponding to the respective identifiable tag from two or more tag readers 136.

In some implementations, determining a location for a respective identifiable tag of the plurality of identifiable tags includes (814) triangulating the location for the respective identifiable tag based on first location data obtained from a first tag reader and second location data obtained from a second tag reader. In some implementations, the server system 108 obtains location data for each of the plurality of identifiable tag from the two or more tag reader 136. For example, the location data indicates the time delay between a tag reader 136 signaling the identifiable tags and receiving a response (e.g., a tag identifiers or a GUID). In some implementations, the server system 108 determines the location of a respective identifiable tag by triangulating the location of the respective identifiable tag based on location data corresponding to the respective identifiable tag from at least two tag readers 136. For example, the time delays observed by the at least two tag readers 136 with respect to the respective identifiable tag and the locations of the at least two tag readers 136 enables server system 108 to triangulate the location of the respective identifiable tag.

The controller device correlates (816) the identity of the tagged physical object with a first set of one or more identifiable tags from among the plurality of identifiable tags based on correspondence between the determined location of the tagged physical object and at least one determined location of the first set of identifiable tags. In some implementations, the server system 108 correlates the identified physical object with one or more identifiable tags whose determined locations are within a predetermined distance of the determined location of the physical object. For example, GUIDs of identifiable tags with determined locations that are within 2.5 cm of the determined location of the physical object are correlated with the identity of the physical object.

The controller device stores (818) the at least one determined location of the first set of identifiable tags, tag identifiers of the first set identifiable tags, and the identity of the tagged physical object in a physical object tracking table. In some implementations, the server system 108 maintains the object tracking table 116, which includes a plurality of entries for physical objects. In some implementations, after correlating an identified physical object with one or more identifiable tags, the server system 108 stores an entry in the object tracking table 116 for the identified physical object. In FIG. 5, for example, a respective entry in the object tracking table 116 corresponding a respective physical object includes an object identity 522 of the respective physical object (if determined), one or more tag identifiers 524 for identifiable tags correlated with the respective physical object, and a current location 526 of the physical object.

In some implementations, the storing further includes (820) assigning the tag identifiers of the first set identifiable tags to a group identifier in the physical object tracking table. Each identifiable tag is associated with a GUID. In some implementations, after correlating a set of identifiable tags a physical object, GUIDs for the set of identifiable tags are grouped or linked together in the object tracking table 116 with a group identifier.

In some implementations, after the storing (822), the controller device receives (824) a request for a location of the tagged physical object from a user, where the request includes the identity of the tagged physical object. For example, a user with access to the object tracking system 100 is associated with a respective client device 104. For example, the respective client device 104 is a tablet, laptop, desktop computer, mobile phone, other computing device, or an interface/panel built into or attached to a wall in the user's residence, and the respective client device 104 is communicatively coupled (e.g., via the network(s) 110, FIG. 1) to the server system 108. Continuing with this example, the user accesses the object tracking system 100 by executing a program or application on the respective client device 104 that is associated with the object tracking system 100 (e.g., the client-side module 102, FIGS. 1 and 4) and entering login credentials corresponding to the user's account for object tracking system 100 so as to authenticate the user. Thereafter, for example, the user requests the current location of a physical object via a text input or voice input captured by the one or more microphones of the client device 104 (e.g., "Where are my red handled scissors?"). Continuing with this example, in response to receiving the request, the client device 104 or a component thereof (e.g., the request handling module 442, FIG. 3) sends the request to the server system 108, where the request includes the identity of the physical object (e.g., the red handled scissors). Alternatively, in another example, the server system 108 directly receives the location request from the user. In this example, the server system 108 is a computer or server at the user's residence that is connected to the external devices via a home network. In this example, the user is able to directly issue requests to the server system 108 via the microphone(s) 134 located throughout the residence. For example, the user is able to start speaking within the range of the microphone(s) 134 to issue a request to the server system 108 such as "Hal, I can't find my sunglasses, please tell me where they are."

In some implementations, in response to receiving the request for the location of the tagged physical object, the controller device (826): determines a current location of one of the first set of identifiable tags based on the physical object tracking table; and provides location information corresponding to the current location of the tagged physical object to the user. In some implementations, after receiving the location request, the server system 108 or a component thereof (e.g., the requesting handling module 340, FIG. 3 and/or the responding module 342, FIG. 3) determines a current location of the physical object identified in the location request. For example, server system 108 maintains an object tracking table 116 that links physical objects associated with the object tracking system 100 with their current locations. Thus, the object tracking table 116 enables the server system 108 to determine the current location of the physical object as the identity of the physical object is included in the location request.

In some implementations, location information corresponding to the current location physical object identified in the location request is provided to the user (e.g., the server system 108 controls speakers in the user's residence to audibly inform the user of the physical object's location) or a respective client device 104 (e.g., for presentation to the user on a display and/or via speakers of the respective client device 104). In some implementations, the location information is the absolute coordinates of the physical object or coordinates of the physical object relative to the dimensions of the residence of the user.

In some implementations, the location information provided to the user includes (828) the current location of the physical object relative to another frequently used physical object. In some implementations, instead of providing meaningless or unhelpful coordinates to the user or to the client device 104, the location information provided by the server system 108 includes the location of the physical object identified by the location request relative to an object that is frequently used by the user. For example, the location information states: "Your scissors are in the upstairs bathroom drawer near the face wash." In some implementations, the location information provided by the server system 108 includes the location of the physical object identified by the location request in relational to the user's residence such as "Your sunglasses are upstairs in your bathroom. As such, the server system 108 provides location information in an efficient, convenient, and user-friendly manner that makes it easy for the user to locate the physical object.

In some implementations, the location information provided to the user includes the current location of the physical object relative to a second used physical object that is highly visible. For example, the location information states: "Your shoes are in the hall near the framed painting." In this example, the "framed painting" is a highly visible physical object that is a good reference point but not necessarily a frequently used physical object.

In some implementations, after the storing (822), the controller device receives (830) a request for the identity of the tagged physical object from a user. In one example, a user with access to the object tracking system 100 takes a photo of a physical object with his/her client device 104 and uploads the photo to the program or application on the client device 104 that is associated with the object tracking system 100 (e.g., the client-side module 102, FIGS. 1 and 4) so as to request the identity of the physical object. Continuing with this example, in response to receiving the request, the client device 104 or a component thereof (e.g., the request handling module 442, FIG. 3) sends the request to the server system 108, where the request includes the photo of the physical object and/or the location of the client device 104 when the photo was captured. Alternatively, in another example, the server system 108 directly receives the identity request from the user. In this example, the server system 108 is a computer or server at the user's residence that is connected to the external devices via a home network. In this example, the user is able to directly issue requests to the server system 108 via the microphone(s) 134 located throughout the residence. For example, the user is able to pick up a physical object while in the field of view of the video camera(s) 132 and within the range of the microphone(s) 134 and issue a request to the server system 108 such as "Hal, please tell me what this object is."

In some implementations, in response to receiving the request for the identity of the tagged physical object, the controller device (832): determines the identity of the tagged physical object based on a location of the tagged physical object and the physical object tracking table; and provides the identity of the tagged physical object to the user. As shown above with reference to step 830, in one example, the user picks up a respective physical object and audibly requests that the server system 108 or the client device 104 identify the respective physical object, and, in another example, the user captures an image of the physical object with the client device 104 and requests the identity of the physical object. In some implementations, the server system 108 determines the identity of the physical object corresponding to the identity request based on the current location of the physical object as stored in the object tracking table 116 and the location of the physical object in the photo or while being picked up, motioned to, or referred to by the user.

In some embodiments, the object tracking table 116 includes additional information associated with tagged physical objects such as usage information associated with a physical object, the date the physical object was bought by a user of the object tracking system 100 or entered the residence of the user associated with the object tracking system 100, the date the physical object was identified by the object tracking system 100), cost of the physical object, a category associated with the physical object, a user of the object tracking system 100 to which the physical object belongs, a user of object tracking system 100 who most frequently uses the physical object, and the like. As such, the server system 108 is able to answer other user queries associated with physical objects accounted for in the object tracking table 116 in addition to the location and identity requests such as "How many pairs of shoes are in my closet?", "What's on the top self of the pantry?", "How much did I buy this audio receiver for?", "How long ago did I buy this TV?", "When was the last time we used this bread maker?", "Did someone rearrange the cups?", or "Did any cups get knocked over?"

In some implementations, after the storing (822), the controller device determines (834) a current location of at least one of the first set of identifiable tags, and, in accordance with a determination that the difference between the current location of the at least one of the first set of identifiable tags and the stored location of the at least one of the first set of identifiable tags exceeds a predetermined distance, the controller device updates (836) the physical tracking object table to indicate the current location of the at least one of the first set of identifiable tags. For example, physical objects do not remain static; instead, physical objects are moved by users. As such, in some implementations, for a respective physical object, the server system 108 updates the current location of the respective physical objects in the entry associated with the respective physical object in the object tracking table 116 as the respective physical object moves. In some implementations, the server system 108 updates the entry associated with the respective physical object in the object tracking table 116 when the difference in location is greater than a predetermined movement threshold (e.g., 15 cm, 30 cm, etc.). For example, an entry in the object tracking table 116 that corresponds to a respective physical object does not need to be updated when the respective physical object moves around in a drawer; however, the entry in the object tracking table 116 that corresponds to the respective physical object does need to be updated when the respective physical object moves to a different location in the same room or to a different room.

For example, identifiable tags fall off of physical objects or additional identifiable tags are attached to physical objects. Thus, over time the server system 108 un-correlates identifiable tags from physical objects or correlates additional identifiable tags with physical objects. As such, in some implementations, the server system 108 also updates the one or more tag identifiers 524 for identifiable tags correlated with the respective physical object in the entry associated with the respective physical object in the object tracking table 116 as identifiable tags fall off of the respective physical object and additional identifiable tags are adhered or attached to the respective physical object.

In some implementations, the controller device generates (838) a three-dimensional (3D) point cloud model with a plurality of points, where the plurality of points correspond to the location of each of the plurality of identifiable tags, and the correlating includes labeling points in the 3D point cloud model that correspond to the first set of identifiable tags with the identity of the physical object. In some implementations, the tag tracking table 114 is represented as a 3D point cloud, where each point in the 3D point cloud corresponds to a location of an identifiable tag. In some implementations, after the correlating, one or more identifiable tags in the 3D point cloud are labeled with a correlated physical object or the identity thereof. For example, the server system 108 provides the labeled 3D point cloud to the user (e.g., in response to a request) for presentation on a client device 104 associated with the user so as to visualize the locations of physical objects in the user's residence.

It will be understood that, although the terms "first," "second," etc. may be used herein to describe various elements, these elements should not be limited by these terms. These terms are only used to distinguish one element from another. For example, a first tag reader could be termed a second tag reader, and, similarly, a second tag reader could be termed a first tag reader, without changing the meaning of the description, so long as all occurrences of the "first tag reader" are renamed consistently and all occurrences of the "second tag reader" are renamed consistently. The first tag reader and the second tag reader are both tag readers, but they are not the same tag reader.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in

What is claimed is:

1. A method of identifying and monitoring a plurality of unidentified, tagged physical objects, the method comprising:
at a controller device with one or more processors and memory:
determining an identity and a location of a tagged physical object based on contextual information received from one or more sources;
determining locations for each of a plurality of identifiable tags with associated tag identifiers, wherein the locations for each of the plurality of identifiable tags are based on location data corresponding to each respective identifiable tag from two or more tag readers;
correlating the identity of the tagged physical object with a first set of one or more identifiable tags from among the plurality of identifiable tags when the determined location of the tagged physical object is within a predetermined distance of the at least one determined location of the first set of identifiable tags;
storing the at least one determined location of the first set of identifiable tags, tag identifiers of the first set of identifiable tags, and the identity of the tagged physical object in a physical object tracking table; and
providing location information corresponding to the current location of a tagged physical object upon request by a user, wherein the location information is determined based at least in part on the at least one determined location of the first set of identifiable tags, the tag identifiers of the first set of identifiable tags, and the identity of the tagged physical object stored in the physical object tracking table.

2. The method of claim 1, further comprising:
after the storing:
receiving a request for a location of the tagged physical object from a user, wherein the request includes the identity of the tagged physical object; and
in response to receiving the request:
determining a current location of one of the first set of identifiable tags based on the physical object tracking table; and
providing location information corresponding to the current location of the tagged physical object to the user.

3. The method of claim 2, wherein the location information provided to the user includes the current location of the physical object relative to another frequently used physical object that is frequently used by the user requesting location information.

4. The method of claim 1, further comprising:
after the storing:
receiving a request for the identity of the tagged physical object from a user; and
in response to receiving the request:
determining the identity of the tagged physical object based on a location of the tagged physical object and the physical object tracking table; and
providing the identity of the tagged physical object to the user.

5. The method of claim 1, further comprising:
after the storing:
determining a current location at least one of the first set of identifiable tags; and
in accordance with a determination that the difference between the current location of the at least one of the first set of identifiable tags and the stored location of the at least one of the first set of identifiable tags exceeds a predetermined distance, updating the physical tracking object table to indicate the current location of the at least one of the first set of identifiable tags.

6. The method of claim 1, wherein the storing further includes:
assigning the tag identifiers of the first set identifiable tags to a group identifier in the physical object tracking table.

7. The method of claim 1, further comprising:
generating a three-dimensional (3D) point cloud model with a plurality of points, wherein the plurality of points correspond to the location of each of the plurality of identifiable tags as obtained from the two or more tag readers, and
wherein correlating the identity of the tagged physical object with the first set of identifiable tags includes labeling points in the 3D point cloud model that correspond to the first set of identifiable tags with the identity of the physical object.

8. The method of claim 1, wherein the contextual information includes at least one of: image recognition information, barcode information, and audio information.

9. The method of claim 1, wherein determining a location for a respective identifiable tag of the plurality of identifiable tags includes:
triangulating the location for the respective identifiable tag based on first location data obtained from a first tag reader and second location data obtained from a second tag reader, wherein the first and second tag readers respectively obtain a time delay for each identifiable tag based on the elapsed time between a pulsed signal and a received response.

10. The method of claim 1, wherein determining the identity of the tagged physical object includes:
determining the identity of the tagged physical object based on audio data obtained from the one or more sources, wherein the audio data includes a user voice information related to the identity of the tagged physical object.

11. The method of claim 1, wherein determining the identity of the tagged physical object includes:

determining a three-dimensional (3D) model of the tagged physical object based on locations of the first set of identifiable tags correlated with the tagged physical object; and determining the identity of the tagged physical object based on the determined 3D model.

12. The method of claim 1, further comprising:

storing usage information corresponding to the tagged physical object, wherein the usage information includes motion characteristics of locations of the first set of identifiable tags; and wherein determining the identity of the tagged physical object includes determining the identity of the tagged physical object based on stored usage information.

13. The method of claim 1, wherein the plurality of identifiable tags include passive RFID tags that are microscopic and safe for human ingestion and that are applied to the tagged physical object by one or more automatically activated tag applicators.

14. A controller device, comprising:

one or more processors; and memory storing one or more programs to be executed by the one or more processors, the one or more programs comprising instructions for:

determining an identity and a location of a tagged physical object based on contextual information received from one or more sources;

determining locations for each of a plurality of identifiable tags with associated tag identifiers, wherein the locations for each of the plurality of identifiable tags are based on location data corresponding to each respective identifiable tag from two or more tag readers;

correlating the identity of the tagged physical object with a first set of one or more identifiable tags from among the plurality of identifiable tags when the determined location of the tagged physical object is within a predetermined distance of the at least one determined location of the first set of identifiable tags;

storing the at least one determined location of the first set of identifiable tags, tag identifiers of the first set of identifiable tags, and the identity of the tagged physical object in a physical object tracking table; and providing location information corresponding to the current location of a tagged physical object upon request by a user, wherein the location information is determined based at least in part on the at least one determined location of the first set of identifiable tags, the tag identifiers of the first set of identifiable tags, and the identity of the tagged physical object stored in the physical object tracking table.

15. The controller device of claim 14, wherein determining a location for a respective identifiable tag of the plurality of identifiable tags includes:

triangulating the location for the respective identifiable tag based on first location data obtained from a first tag reader and second location data obtained from a second tag reader, wherein the first and second tag readers respectively obtain a time delay for each identifiable tag based on the elapsed time between a pulsed signal and a received response.

16. The controller device of claim 14, wherein determining the identity of the tagged physical object includes:

determining the identity of the tagged physical object based on audio data obtained from the one or more sources, wherein the audio data includes a user voice information related to the identity of the tagged physical object.

17. The controller device of claim 14, wherein determining the identity of the tagged physical object includes:

determining a three-dimensional (3D) model of the tagged physical object based on locations of the first set of identifiable tags as obtained from the two or more tag readers and as correlated with the tagged physical object; and determining the identity of the tagged physical object based on the determined 3D model.

18. A non-transitory computer readable storage medium storing one or more programs, the one or more programs comprising instructions, which, when executed by a controller device with one or more processors, cause the controller device to perform operations comprising:

determining an identity and a location of a tagged physical object based on contextual information received from one or more sources;

determining locations for each of a plurality of identifiable tags with associated tag identifiers, wherein the locations for each of the plurality of identifiable tags are based on location data corresponding to each respective identifiable tag from two or more tag readers;

correlating the identity of the tagged physical object with a first set of one or more identifiable tags from among the plurality of identifiable tags when the determined location of the tagged physical object is within a predetermined distance of the at least one determined location of the first set of identifiable tags;

storing the at least one determined location of the first set of identifiable tags, tag identifiers of the first set of identifiable tags, and the identity of the tagged physical object in a physical object tracking table; and providing location information corresponding to the current location of a tagged physical object upon request by a user, wherein the location information is determined based at least in part on the at least one determined location of the first set of identifiable tags, the tag identifiers of the first set of identifiable tags, and the identity of the tagged physical object stored in the physical object tracking table.

19. The non-transitory computer readable storage medium of claim 18, wherein determining a location for a respective identifiable tag of the plurality of identifiable tags includes triangulating the location for the respective identifiable tag based on first location data obtained from a first tag reader and second location data obtained from a second tag reader; and wherein the location information corresponding to the current location of a tagged physical object upon request by a user is provided as the average location of the locations for the respective identifiable tags correlated with the tagged physical object.

20. The non-transitory computer readable storage medium of claim 18, wherein determining the identity of the tagged physical object includes:

determining the identity of the tagged physical object based on audio data obtained from the one or more sources, wherein the audio data includes a user voice information related to the identity of the tagged physical object.

* * * * *